United States Patent [19]
Holler

[11] Patent Number: 6,049,669
[45] Date of Patent: Apr. 11, 2000

[54] EXPLOITING CASE CORRELATION TO INCREASE PERFORMANCE OF PROGRAMS WITH BRANCH/SWITCH INSTRUCTIONS

[75] Inventor: Anne M. Holler, San Jose, Calif.

[73] Assignee: Hewlett-Packard Company, Palo Alto, Calif.

[21] Appl. No.: 08/843,909

[22] Filed: Apr. 17, 1997

[51] Int. Cl.[7] ........................................................ G06F 9/44
[52] U.S. Cl. ............................ 395/709; 395/704; 395/705
[58] Field of Search ..................................... 395/709, 704, 395/705, 708, 207, 209, 676

[56] References Cited

PUBLICATIONS

Code Complete Steve McConnell pp. 317–322, Apr. 16, 1993.

*Primary Examiner*—Tariq R. Hafiz
*Assistant Examiner*—Todd Ingberg
*Attorney, Agent, or Firm*—Christine H. Smith

[57] ABSTRACT

Data processing time is enhanced in a system in which the executable code has inserted therein certain instructions, by a system and method which anticipates which switch will occur when multipath decision points are reached. The code is profiled using test data and a record is made as to the history of the possible switch states. This record is used to optimize the revised executable code, based upon probability of selection.

25 Claims, 3 Drawing Sheets

```
LOOP
    <OTHER CODE>
    SWITCH WHATEVER
        CASE A:
            <CODE FOR CASE A>
        CASE B:
            <CODE FOR CASE B>
        CASE C:
            <CODE FOR CASE C>
            •
            •
            •
        END SWITCH
    <OTHER CODE>
        •
        •
        •
END LOOP
```

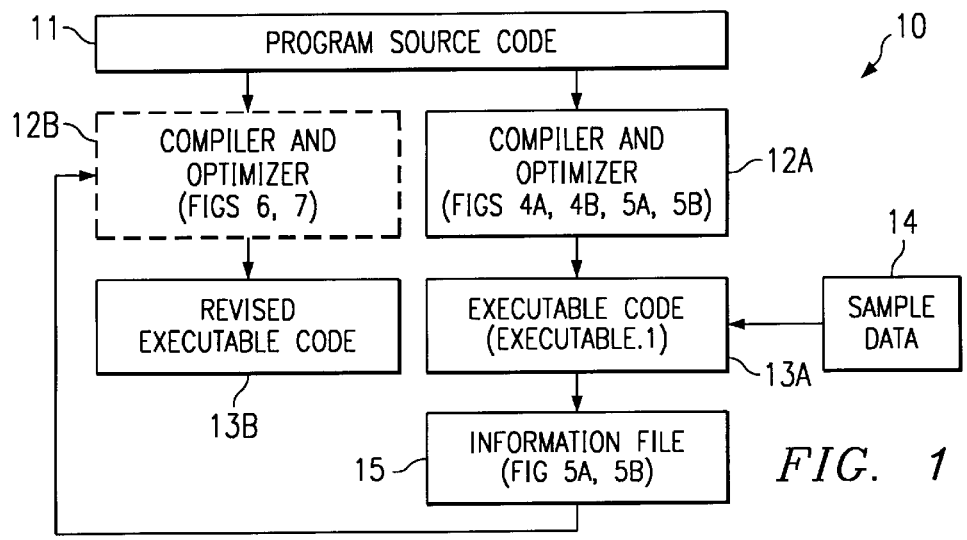
FIG. 1
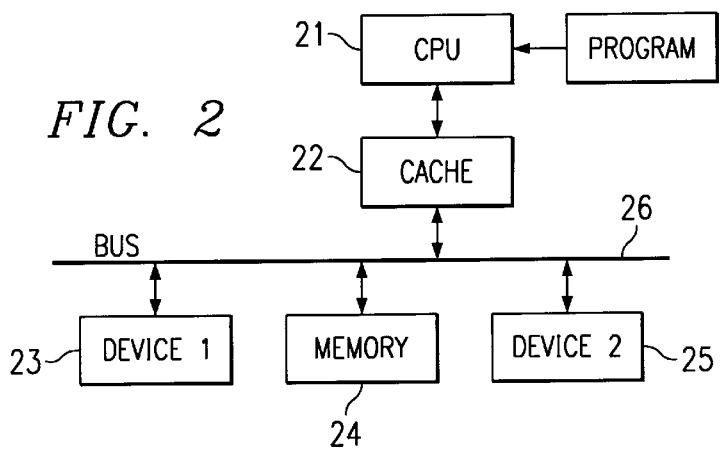
FIG. 2
30 — PROGRAM C (SOURCE)
31 — CC PROGRAM.C → EXECUTABLE
FIG. 3A
```
LOOP
  <OTHER CODE>
  SWITCH WHATEVER
    CASE A:
      <CODE FOR CASE A>
    CASE B:
      <CODE FOR CASE B>
    CASE C:
      <CODE FOR CASE C>
      .
      .
      .
  END SWITCH
  <OTHER CODE>
  .
  .
  .
END LOOP
```
FIG. 3B

40 ～ PROGRAM.C (SOURCE)

41 ／ CC PROGRAM.C +l → EXECUTABLE.1

FIG. 4A

```
LOOP
  COUNTER 1++;
  <OTHER CODE>
  SWITCH WHATEVER
    CASE A:
    COUNTER 2++;
      <CODE FOR CASE A>
    CASE B:
    COUNTER 3++;
      <CODE FOR CASE B>
    CASE C:
    COUNTER 4++;
      <CODE FOR CASE C>
    .
    .
    .
    COUNTER n++;
  END SWITCH
  <OTHER CODE>
  .
  .
  .
END LOOP
```

FIG. 4B

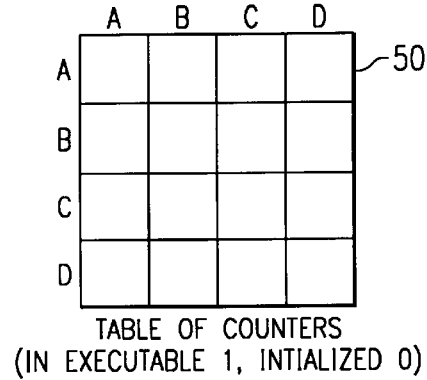

TABLE OF COUNTERS
(IN EXECUTABLE 1, INTIALIZED 0)

FIG. 5A

PREVIOUS CASE VALUE SEEN : [ 51 ]

FIG. 5B

PROGRAM.C (SOURCE)

60 ／ CC PROGRAM.C +P → REVISED EXECUTABLE

FIG. 6

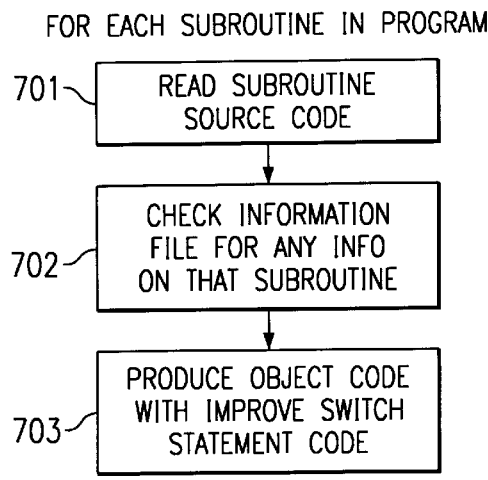

FIG. 7

EXPLOITING CASE CORRELATION TO INCREASE PERFORMANCE OF PROGRAMS WITH BRANCH/SWITCH INSTRUCTIONS

TECHNICAL FIELD OF THE INVENTION

This invention relates to computer program systems in which performance is increased and more particularly to a system and method for using or exploiting case correlation to increase the program performance.

BACKGROUND OF THE INVENTION

Currently, computer program source code often contains constructs called "switch statements" which are multi-way branches. When such statements, in the form of object code, run in real-time, the branch that is taken depends on the value of the data that is present at that time. When a switch statement is inside a program loop, there may be a pattern to which branch is selected branch as the loop is executed. Such patterns can be used, if predictable, to optimize system performance, particularly as the code is being compiled from the source program.

However, a branch statement is expensive (in terms of machine cycles) on modern computer systems. This is particularly so when a branch is an indirect branch, meaning that the branch is unpredictable as to where it might go. Most instructions today can execute in a cycle or less so that often several instructions could execute during the same cycle. But when a branch statement is encountered, it might take perhaps six cycles to figure out where the target of the branch is, i.e., which branch is being followed and to obtain the necessary data from memory.

Another problem with branches, other than the fact that they are expensive to execute, is that they tend to introduce bottlenecks where the code optimizer (during the compiling stage) is not able to do as effective a job as it might otherwise do. When the compiler optimizer encounters a branch, it cannot effectively combine instructions from beyond that branch with instructions from prior to that branch. This then does not allow the compiled code to be properly optimized for run-time performance.

Therefore, there is a need in the art for a system and method for optimizing run-time code in the face of branches and switch statements.

SUMMARY OF THE INVENTION

These and other objects, features and technical advantages are achieved in one embodiment of the invention in which the program that is being compiled is run through a compiler/optimizer to observe the selection of the various branches in the face of a set of data. The system and method of this invention addresses the performance impact of switch statements inside loops by collecting data on the behavior of those switch statements during a particular training run of the program. The collected data is then used by the optimizer to revise the object code produced for that program so that when a particular case within the switch statement is selected, another case may be the most likely. The system is then biased to run the most likely selection that will flow from the first selected case as though a switch statement did not exist, and the data is prefetched from memory using this assumption. During run-time when the conditions are present for a branch, then the branch path is followed, at a cost of some processing time. Thus, in concept the idea is to bias the switch statement cases so that they tend to flow easily into the case which is most likely to follow.

Therefore, it is a technical advantage of this invention that for likely cases (branches) that follow other cases, branches can be avoided in the codes, thereby saving clock cycles.

It is a still further technical advantage that the code can be optimized over several cases for the situation where a particular case is followed by another expected case.

It is a technical advantage of this invention that the code when it executes looks to past history to make a determination as to the most probable next history, thereby allowing the instruction memory cache to be preloaded with the data required for the expected next branch.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates the overall system and method of the invention;

FIG. 2 illustrates a typical CPU system structure in which the invention could operate;

FIGS. 3A and 3B illustrate the typical compiler invocation and the resulting code format;

FIGS. 4A and 4B illustrate the modified computer program instruction and the resulting code format;

FIG. 5A is a chart of the frequency of selection of each branch;

FIG. 5B is a register of the last case seen;

FIG. 6 illustrates the program step which controls the last phase of the system;

FIG. 7 illustrates the flow diagram of the modification of code based upon the frequency table of FIG. 5A; and FIGS. 8A, 8B, 9A, 9B, 10A, 10B, 11A, 11B, 12A, 12B, 13A and 13B are charts showing the interim steps arriving at the chart of FIG. 5A.

DESCRIPTION OF THE PREFERRED EMBODIMENTS

Before beginning a discussion of the invention, it would perhaps be helpful to review the structure of a typical computing system. Such a typical system is shown in FIG. 2, having CPU 21, cache memory 22, bus 26 connecting main memory 24, to the cache and perhaps several devices 23, 25, connected to the bus. CPU 21, under control of a program, such as Program 30, would typically attempt the retrieve information (data) from the main memory 24. Such an information fetch would typically require 50 nCPU cycles to achieve. However, if the desired information is located in cache 22, then the time requirement could be reduced to about 2 CPU cycles, depending upon the relative speeds of the CPU and the memory 24.

There is shown in FIG. 1 system 10 for optimizing code, such as program source code 11, which code is passed through a compiler and optimizer 12A to produce executable code 13A. Compiler and optimizer 12A in the normal mode would operate on code using CC PROGRAM.C (shown in FIG. 3A) to produce executable code 31. The compiled code would contain switch statements, as shown in FIG. 3B.

As the code is run, table 50 (as will be detailed hereinafter) is created as shown in FIG. 5A. Table 50 is labeled for the various switch possibilities and has columns for the selection of those possibilities. Initially, before the program is run on the test data, the table of counters will be zero. Once the compiler and optimizer has produced executable code containing the information in FIGS. 5A and 5B, that executable code is run on sample data 14, FIG. 1. As the executable code is running, the system is collecting the information necessary for table 50 to be created and at the end of the execution run, the result of that information is output into an information file 15 (FIG. 1). Information in file 15 is then read by compiler and optimizer 12B, which is the same compiler and optimizer as 12A with a different command line as shown in FIG. 6.

FIG. 7 shows an overview of compiler and optimizer 12B, using the data in file 15, as it produces revised executable code. This revised code will run faster than the original executable code by virtue of anticipating the branches of the switch statements and thus having the necessary data prefetched into cache 22.

As shown in FIG. 7, each subroutine of the program is read as shown in block 701. Then, in block 702, information file 15 is checked to see if there is any information on that subroutine. In particular, the system is looking for the type of information that was discussed with respect to FIGS. 5A and 5B. Using the information from file 15 and the source code, there is produced, via block 702, object code which has switch statements that are improved over the switch statements that would have been produced without that information.

FIGS. 8A–13B illustrate one example of how switch information is gathered and recorded. When a program begins running (FIG. 8A), table 50 of switch values contains all zeros because no switches have occurred. The prior switch condition, shown in register 51 (FIG. 8B) is set to an illegal value indicating that there is no prior switch condition.

As the system runs, it detects the switch condition (selected branch) at a point in time and records that condition (branch A) in register 51, as shown in FIG. 9B. Note that file 50 in FIG. 8A is still all blanks because no actual transition has occurred.

In FIG. 10A, the system sees a switch to branch B (now recorded in register 51 of FIG. 10B) and, using the previous value A from register 51 of FIG. 9B, the system records the A to B switch by putting a "1" in box 1001.

At some later time the system detects a switch to branch C and records that switch in register 51, FIG. 11B. At the same time a "1" is put in box 1101 indicating a branch B to branch C transition.

Assume now a passage of time and during this time switch transitions have been detected and recorded. In such a situation table 50 might look like FIG. 12A with 150 A to B transitions now recorded in box 1001, 200 B to C transitions in box 1101, 50 C to B transitions in box 1201 and 8 branch C to branch C transitions in box 1202.

At the next transition (perhaps the last transition of the program) there is a branch C to branch B transition. Now, as shown in FIG. 13A, box 1201 contains the number 51 and register 51 (FIG. 13B) contains a B.

At this point it is apparent that the transition from branch A to branch B (box 1001) is more likely to occur than is a transition from branch A to itself, to branch C or to branch D. When the system is executing within branch B, a transition to branch C (box 1101) is most likely to occur. The system is not likely to go from B to A or from B to D, nor is it likely to remain in branch B, since these all show zeros. Similarly, if the system is in branch C, it is more likely, per box 1201, to transition to branch B then it is to transition to any other branch. The next most likely branch from C would be to itself per box 1202.

It should be noted that although it is hard to tell from the transition tables, there can be a transition from one state to the same state, as shown by the number 3 in box 1203 and the number 8 in box 1202 of FIG. 13A.

Using this data, we can, as discussed above with respect to FIG. 1, use information file 15 in conjunction with compiler and optimizer 12B to generate revised executable code 13B, taking advantage of the pattern of execution recorded for the switch statements.

Although the present invention and its advantages have been described in detail, it should be understood that various changes, substitutions and alterations can be made herein without departing from the spirit and scope of the invention as defined by the appended claims.

What is claimed is:

1. A method for controlling the flow of code compiled from a source program, the method comprising the steps of:

generating executable code from the source program;

operating the generated executable code with a set of sample data;

observing the operation of the generated executable code to generate information about the operation of the executable code with respect to various branch instructions within the executable code; and regenerating from the source program a revised executable code, the revised executable code having inserted within it instructions reflecting branch preferences at certain locations in accordance with the generated information pertaining to said branches;

wherein the step of observing includes the step of observing the operation of the generated executable code during its operation of the executable code with respect to at least one branch-switch instruction within the executable code, wherein the at least one branch-switch instruction has at least three possible branch targets; and the step of regenerating includes the step of regenerating a revised executable code from the source program, wherein the revised executable code includes instructions reflecting branch target preferences of the at least one branch-switch instruction in accordance with the information inserted therein.

2. The method set forth in claim 1 wherein the information generated is the frequency of switches with respect to the possible code branches.

3. The method set forth in claim 2 wherein the instructions reflecting branch preferences are inserted according to the relative frequency of branch selections.

4. The method set forth in claim 1 further including the steps of:

repeating the operating, observing and regenerating steps, using different sample data; and selecting which revised executable code is best suited for a given type of data.

5. In a system having a CPU operating under control of executable code compiled from a source code program, the improvement comprising:

means for examining the run-time of at least one branch-switch instruction within the executable code as compiled from the source code program to determine portions of the executable code that would benefit from the insertion of instructions reflecting branch preferences, wherein the at least one switch instruction has at least three possible branch targets: and means for compiling a modified version of the executable code from the source code program, said modified code version containing instructions reflecting branch target preferences inserted therein in conjunction with the at least one switch instruction that have been determined to have a high probability of being the proper branch target when the program is executed on a set of data.

6. The invention set forth in claim 5 wherein said examining means includes means for generating an information file of data pertaining to the respective selections of the various branch operations of the program.

7. The invention set forth in claim 6 wherein said modified executable code compiling means includes:
means for utilizing the data contained in said information file.

8. The invention set forth in claim 7 wherein said utilization means includes:
means for selecting the magnitude of the selections that are used to determine preferences.

9. The invention set forth in claim 5 wherein said examining means includes:
means for running the executable code based on a set of data; and
means for profiling the run-time of the executable code.

10. The invention set forth in claim 9 wherein the profiling means includes:
means for generating an information file of data pertaining to the respective frequency of utilizations of the various branch operations of the at least one branch-switch instruction of the run-time of the executable code.

11. The invention set forth in claim 10 wherein said modified executable code compiling means includes:
means for utilizing the data contained in said information file.

12. The invention set forth in claim 11 wherein said utilization means includes:
means for selecting the magnitude of the branch utilization frequency that is utilized for determining the branch target preferences.

13. A system for controlling the insertion of instructions containing branch preferences into code compiled from a source program, the system comprising:
means for generating executable code from the source program;
means for running the generated executable code with a set of sample data;
means for observing the operation of the generated executable code while it is running with the sample data to generate information about the operation of the executable code with respect to at least one branch-switch instruction within the executable code, wherein the at least one branch-switch instruction has at least three possible branch targets; and means for compiling from the source program a revised executable code, the revised executable code having inserted within it instructions in accordance with the generated information pertaining to the possible branch targets in the code.

14. The system set forth in claim 13 wherein the information generated is the frequency of each branch utilization with respect to the at least one branch-switch instruction and with respect to the sample data.

15. The system set forth in claim 14 wherein the revised executable code compiling means includes:
means for inserting the instructions containing the branch target preferences in the revised executable code according to relative magnitude of the respective branch utilizations.

16. The system set forth in claim 15 wherein the inserting means further includes:
means for selecting the magnitude of the branch utilization that will trigger an insertion of an instruction containing a branch target preference.

17. A method for improving processing time for use in a system by inserting instructions pertaining to branch target preferences in executable code so that the system anticipates certain upcoming branch operations and anticipates which one of a plurality of branches is most likely to be utilized, the method comprising the steps of:

examining the run time of at least one branch-switch instruction within the executable code as compiled from the source code program to determine the relative magnitudes of the utilization of each branch of the at least one branch-switch instruction, wherein the at least one branch-switch instruction has at least three possible branch targets; and compiling a modified version of the executable code from the source code program, said modified code version containing the instructions pertaining to branch target preferences for those branches which have been determined by the examining step to have a high degree of probability of being utilized during run-time.

18. The method set forth in claim 17 wherein said examining step includes the step of:
generating an information file of data pertaining to the respective magnitudes of the utilization of the various branches.

19. The method set forth in claim 18 wherein said modified executable code compiling step includes the step of:
utilizing the data contained in said information file.

20. The method set forth in claim 19 wherein said utilization step includes the step of:
selecting the level of the difference between utilized branches in order to establish the probability of the utilization level of a given branch.

21. The method set forth in claim 17 wherein said examining step includes the steps of:
running the executable code based on a set of data; and
profiling the run-time of the executable code.

22. The method set forth in claim 17 wherein the profiling step includes the step of:
generating an information file of data pertaining to the respective actual selection of each particular program branch of the various operations of the at least one branch-switch instruction of the run-time of the executable code.

23. The method set forth in claim 22 wherein said modified executable code compiling step includes the step of:

utilizing the data contained in said information file.

24. The method set forth in claim 22 wherein said utilization step includes the step of:

selecting the magnitude of the hit frequency that is utilized.

25. A method for controlling the flow of code compiled from a source program, the method comprising the steps of:

generating executable code from the source program;

operating the generated executable code with a set of sample data;

observing the operation of the generated executable code during its operation of the executable code with respect to at least one branch-switch instruction within the executable code, wherein the at least one branch-switch instruction has at least three possible branch targets;

recording a history of branch targets taken by the at least one branch-switch instruction; and regenerating a revised executable code from the source program, wherein the revised executable code includes instructions reflecting branch target preferences of the at least one branch-switch instruction in accordance with the history inserted therein.

* * * * *